Figure 1:
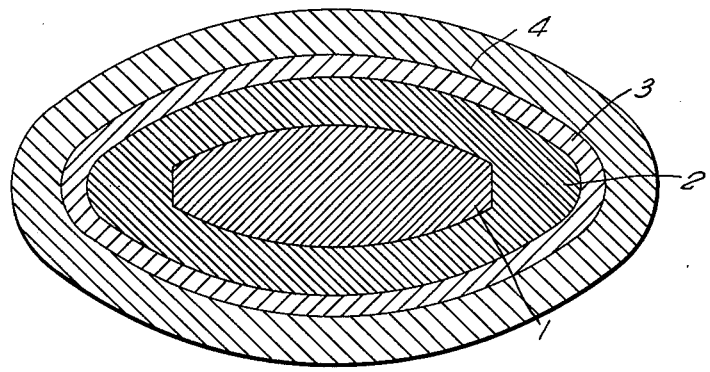

May 18, 1965  D. STEPHENSON  3,184,386

PROLONGED ACTION MEDICINAL TABLETS

Filed Aug. 29, 1962

INVENTOR
Douglas Stephenson

BY
ATTORNEY 3,184,386
PROLONGED ACTION MEDICINAL TABLETS
Douglas Stephenson, London, England, assignor to Burroughs Wellcome & Co. (U.S.A.) Inc., Tuckahoe, N.Y., a corporation of New York
Filed Aug. 29, 1962, Ser. No. 220,265
Claims priority, application Great Britain, May 2, 1958, 14,061/58
9 Claims. (Cl. 167—82)

The present invention relates to the presentation of medicaments in tablets which, when administered by mouth, release the medicament gradually, so that one tablet gives a prolonged period of medication, and is a continuation-in-part of U.S. patent application No. 809,854, filed on April 29, 1959, now abandoned.

Many afflictions, such as travel sickness, rheumatism, and hay fever and other allergic conditions, are controlled most satisfactorily by maintaining the blood level of the medicament used at the optimum therapeutic level. The traditional method of taking several doses of medicament each day is often inconvenient and gives rise to considerable fluctuations in the blood concentration of the medicament.

A more convenient form of presentation of the medicament, prepared by the use of an enteric coating surrounding a core containing the medicament and with an initial dose of the medicament in an outer layer, again causes marked fluctuations in the blood concentration of the medicament. The outer layer releases its medicament in the stomach, and then there is no further release until the tablet passes into the intestine where the enteric coat is dissolved or in some other way removed and the enclosed medicament released. Several types of prolonged-acting preparations have been made in which, in a single dose form, many small units of medicament have been enclosed in coatings of various thicknesses and compositions, so that the medicament is liberated in small amounts over a prolonged period.

Another type of prolonged-acting preparation has been made by dispersing the medicament in a sparingly soluble base so that it is dissolved slowly. For example, the base comprises a fatty acid, alcohol or ester, alone or in admixture, and may contain a waxy material of natural or synthetic source; the product may be mixed with non-prolonged granules obtained by granulating the medicament with a very minor amount of aqueous gelatin. As a further example, the base comprises a protein such as zein which is substantially insoluble in an aqueous solution having a pH in the range of from about 1 to about 8 and at a temperature of about 37° C. and will preferably be present in an amount of from about 20% to about 45% by weight of the final product, and may be modified by being admixed with non-ionic dispersing agents such as lecithin preferably present in an amount of from 0.05% to 5% by weight of the base, and also with plasticisers such as glyceryl fatty acid salts preferably present in an amount of from 5% to 35% by weight of the base; the product may be granulated, and the granules mixed with very minor amounts of lubricants such as magnesium stearate and filled into hard gelatin capsules.

It has now been found that a particularly valuable prolonged-acting material is one containing casein and a lipid. This provides a prolonged and a steady release of the medicament from the surface of the material into the surrounding fluids as the material is slowly digested. The digestion occurs throughout the length of the alimentary track and in particular occurs both in the stomach, where the digestive fluids have an acid pH, and in the intestines, where the digestive fluids have an alkaline pH, so that the release of the medicament does not fluctuate and give rise to fluctuations in the blood concentration of the medicament as the preparation passes through the alimentary tract.

According to the present invention there is provided a prolonged-acting tablet which contains a substantially homogeneous mixture containing a medicament, casein present as 20 to 60% by weight of the mixture and a lipid present as 10 to 50% by weight of the mixture.

According to a feature of the invention the prolonged-acting tablet comprises a central core around which is a layer containing the substantially homogeneous mixture. This procedure has the advantage over a tablet of prolonged release material without a core, that as the material of the tablet dissolves the rate of decrease of the surface area exposed to the surrounding fluids is considerably less and, therefore, the rate of release of the medicament varies less. The core may also contain medicament so that, when the outer layers of the tablet have been digested away, a final dose of the medicament will be released and give a further prolongation of the action.

According to a further feature of the invention the prolonged-acting tablet comprises granules of the substantially homogeneous mixture which are compressed to form a tablet in the usual way. These granules may be mixed with granules which are formulated in the usual manner and are therefore readily digestible and not prolonged acting. The granules may themselves each contain a central core surrounded by a layer of the substantially homogeneous mixture.

The lipid material is sparingly soluble in water and is slowly digestible in the digestive juices. It is essentially a fat, fatty acid, or wax. Thus it may be:

(a) An animal or vegetable wax such as beeswax, carnauba wax, Japan wax, spermaceti, or wool fat; or (b) A solid hydrogenated fixed oil or fat such as hydrogenated castor oil, hydrogenated palm oil, hydrogenated lard or other hydrogenated oils or fats of animal or vegetable origin; or (c) stearic or palmitic acid.

The lipid is preferably mixed with an alkaline earth salt of a fatty acid. Thus, it may be mixed with calcium or magnesium stearate or palmitate or zinc oleate, magnesium stearate being the preferred salt. The lipid and salt together are preferably present as 25 to 70% by weight of the prolonged acting substantially homogeneous mixture.

The medicament and the casein may be mixed with the lipid, which may be molten or in powder form or in solution or suspension in a volatile organic liquid. The mixture may be allowed to harden, and then granulated by conventional methods. The granules may be applied to cores by a compression coating technique for which machines are now available; or in solution or suspension when the cores are rotated in a conventional coating pan. The coated cores may then be compressed, optionally with readily digestible granules as previously described.

An outer layer comprising a dose of medicament dissolved or dispersed in a readily absorbed, that is water-soluble or -digestible, base such as sucrose, glucose, a polyethylene glycol or a mixture of these or other suitable substances may be applied to the tablet or granules by compression coating, or by pan coating when the medicament and the base are dissolved or suspended in a coating solution. The tablets may finally be given a plain sugar coating by compression coating or by pan coating to give protection and to improve the taste and appearance, or an enteric coating by conventional methods known to those skilled in the art to avoid the liberation of the medicament in the stomach.

The duration of the action of the tablets may be controlled by varying the amount and constituents of the prolonged acting substantially homogeneous mixture, although some variations will occur due to individual variations in the age and condition of the patient. In particular, it will be understood that the amount of casein is so chosen as to give the required prolonged acting medication. In cases of allergic conditions, for example, a therapeutically satisfactory blood level of medicament can be maintained for 20 to 24 hours or more, so that one tablet only is required each day, and the condition is controlled throughout the hours of sleep. In cases of travel sickness and the morning sickness of pregnancy, an action lasting for 12 to 15 hours would frequently be sufficient.

This method is applicable to a large number of medicaments, where a prolonged and steady blood level of the medicament is required for the effective control of the affliction. Thus, it is particularly applicable to appetite suppressants and central stimulants such as amphetamines, phenetrazine, diethylpropion and phentermine; antihistamines; phenothiazines and barbiturates; and analgesics, cough suppressants, anticholinesterases and belladona alkaloids. In particular, it is suitable for medicaments which are required in small dose levels.

Figure 2:
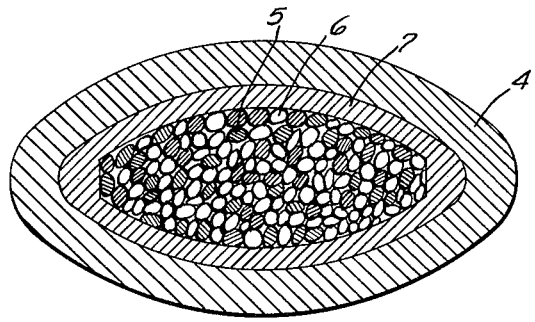
Figure 3:
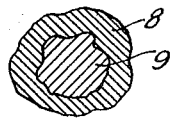

The invention will now be described with reference to the accompanying drawings in which FIGS. 1 and 2 show forms of tablets in cross section and FIG. 3 shows a form of granule in cross section.

Referring to FIG. 1, where a highly potent medicament with a small dose or a medicament which is readily soluble and rapidly absorbed is used, the tablet may be prepared in a concentrically layered form, consisting of a central core 1 of a base which may optionally contain a dose of the medicament. It is an advantage if the base chosen is slightly hygroscopic or stimulates the flow of intestinal fluids or melts at body temperature, and so aids the solution and absorption of the medicament into the blood. The core 1 is coated with a predetermined thickness of the prolonged release material of the substantially homogeneous mixture 2. A third layer 3 may be applied consisting of a dose of the medicament in a base readily absorbed, that is soluble or digestible, in the gastric juices, so that an initial dose of the medicament is rapidly liberated and gives a therapeutically satisfactory blood level of medicament in a short time, which blood level is then maintained by the prolonged release material 2. The tablet may be completed by the application of a conventional sugar coat 4.

When the dose of the medicament is larger or the medicament is only slowly or sparingly soluble and absorbable, the rate of release from a tablet as described above may be too slow, and an increased rate may be obtained as will be described with reference to FIG. 2. Granules 5 of the substantially homogeneous mixture are compressed with granules of soluble or disintegrating material 6 (which optionally contain a dose of medicament). When the tablet comes into contact with the digestive juices, the granules 6 will dissolve or disintegrate rapidly, leaving the prolonged acting granules 5 which will present a larger surface area to the surrounding fluids than the tablet form, and will give a relatively rapid but sustained release of the medicament. The tablet may be completed by the application of a conventional enteric coat 7, and a conventional sugar coat 4.

In FIG. 3 are shown granules which may be used to form a tablet; each granule has a water soluble core 9. A predetermined number of coats 8 of the substantially homogeneous mixture in an organic solvent may be applied to the cores 9 in a conventional coating pan. The cores may optionally contain a dose of the medicament. The granules are compressed with granules of a water-soluble or -disintegrating material as before.

The central core of the tablet or the prolonged acting granules may be (i) A low melting point fat or hydrogenated oil or fat, with or without the addition of waxes or wool fat, which ingredient or mixture of ingredients melts at body temperature to release the medicament.

(ii) A readily soluble inert ingredient which will exert an osmotic effect in the intestine and stimulate the secretion of intestinal fluid so aiding the solution and absorption of the medicament into the blood; examples are the soluble carbohydrates such as lactose, glucose, fructose (laevulose), maltose, sorbitol and mannitol, and harmless soluble salts such as sodium chloride, magnesium sulphate and sodium sulphate;

(iii) A hygroscopic water soluble agent with surface active properties which will also stimulate the flow of intestinal fluids; examples are the polyethylene glycols—more particularly the solid forms—and surface active agents such as sodium sulphosuccinate di-octyl ester; or (iv) A low melting point mixture similar to the conventional suppository bases.

The medicament may be mixed into the molten base, which is allowed to harden and is then granulated. Alternatively, in the case of a polyethylene glycol or a carbohydrate, such as sucrose, the medicament and the base may be powdered and mixed and granulated by conventional methods.

The invention will now be described with reference to the following examples, in which all the temperatures are given in degrees centigrade, and the symbol # designates the standard size of the mesh of the sieve used, as defined in the British Pharmacopoeia, 1958, page 968.

EXAMPLE 1

(a) *The central core*

Triprolidine hydrochloride (12.5 g., 100#) and polyethylene glycol 4000 (237.5 g., 100#) were mixed and granulated with 50% ethanol (20 mls.), sifted 20# and dried. Magnesium stearate (7.5 g.) was added to the granules.

(b) *The substantially homogeneous prolonged acting coating (mixture)*

Triprolidine hydrochloride (12.5 g., 100#) and casein (250 g., 100#) were mixed and added to a molten mass consisting of hydrogenated castor oil (1.25 g.) and magnesium stearate (125 g.). The resulting mixture was allowed to harden and then sifted 30#.

The core and coating granules were successively compressed on a commercial compression coating machine. The product had a core weight of 50 mgms. and a coating weight of 102.5 mgms.

The products were put into a conventional coating pan, and were given one or more applications of subcoating materials. Triprolidine hydrochloride equivalent to 2.5 mgms. for each product, with a small amount added to allow for losses in manipulation, was dissolved in the minimum quantity of water, and syrup sufficient for five applications added. The solution was applied to the rotating products, and any material adhering to the pan was removed, dissolved in syrup and re-applied. The coating was then completed in the conventional way.

EXAMPLE 2

(a) *Conventional granules*

Cyclizine hydrochloride (125 g.), sucrose (125 g.), and starch (12.5 g.) were mixed and granulated with water (15 mls.), sifted 20# and dried.

(b) *Substantially homogeneous mixture prolonged-acting granules*

Whites beeswax (67.5 g.) and magnesium stearate (67.5 g.) were melted, and cyclizine hydrochloride (150 g.) and casein (135 g.) successively mixed in. The mass was allowed to harden and was then sifted 20#. The finer granules and powder were removed by sifting 22#, and were then remelted and granulated as before. The process was repeated until sufficient granules between 20# and 22# were obtained.

The ordinary and prolonged-acting granules were mixed, and magnesium stearate (7 g.) and starch (35 g.) were added. The mixture was compressed into tablets. A conventional enteric coating was applied to the tablets and then they were given a conventional sugar coating.

EXAMPLE 3

An inert inner core of lactose (50 mg.) was prepared by granulation and compression.

Substantially homogeneous mixture granules were prepared from either of the following groups of substances:

(a)

| | Mg. |
|---|---|
| Hydrogenated castor oil | 25 |
| Magnesium stearate | 25 |
| Cyclizine base | 44 |
| Casein | 35 |

(b)

| | Mg. |
|---|---|
| Beeswax | 25 |
| Magnesium stearate | 25 |
| Cyclizine base | 44 |
| Casein | 35 |

The hydrogenated castor oil or beeswax was melted, and the magnesium stearate, cyclizine base and casein were added successively. The mixture was cooled and sifted 30#.

The substantially homogeneous mixture granules were compressed around the inert core on a compression coating machine.

EXAMPLE 4

(a) The central core

| | Mg. |
|---|---|
| Triprolidine hydrochloride, 100# | 2.5 |
| Polyethylene glycol 4000 | 47.5 |
| Magnesium stearate | 0.5 |

The triprolidine hydrochloride and polyethylene glycol were mixed and granulated with 50% alcohol. The granules were sifted 20#, dried at a temperature not exceeding 40° and sifted 30#. The magnesium stearate was added, and the mixture compressed to a core weighing 50.5 mg.

(b) The middle, prolonged acting layer

| | Mg. |
|---|---|
| Triprolidine hydrochloride, 100# | 5.5 |
| Hydrogenated castor oil | 64.0 |
| Casein | 46.0 |
| Magnesium stearate | 55.0 |

The hydrogenated castor oil was melted and the bulk of the magnesium stearate (53 mg.) mixed in until a soft mass was obtained. The triprolidine hydrochloride and the casein were triturated and the mixture added to the molten wax mixture. When the resulting mixture was homogeneous and evenly soft it was turned out onto trays to cool quickly. When cold and hard the mixture was ground and sifted 30#. The rest of the magnesium stearate was added, and the granules (170.5 mg.) were compressed around the central core (a) on a compression coating machine.

(c) The outer layer

| | Mg. |
|---|---|
| Triprolidine hydrochloride, 100# | 2.0 |
| Lactose | 100.0 |
| Cerelose (110 parts equivalent to 100 parts of dextrose) | 88.0 |
| Potato starch | 30.5 |
| Magnesium stearate | 2.5 |

The triprolidine hydrochloride and starch were triturated. The lactose and cerelose were mixed in successively. The mixture was granulated with 10% gelatin in 50% alcohol, sifted 30#, dried at 55° and sifted 30#. The magnesium stearate was added, and the mixture was compressed around the middle layer (b) on a compression coating machine.

EXAMPLE 5

(a) The central core

| | Mg. |
|---|---|
| Procyclidine hydrochloride, 100# | 2.5 |
| Polyethylene glycol 4000 | 27.0 |
| Magnesium stearate | 0.4 |

The procyclidine hydrochloride and polyethylene glycol were mixed, and granulated with 50% alcohol. The granules were sifted 20#, dried at 40° and sifted 30#. The magnesium stearate was added, and the mixture compressed to a core weighing 29.9 mg.

(b) The midde, prolonged acting layer

| | Mg. |
|---|---|
| Procyclidine hydrochloride, 100# | 5.5 |
| Hydrogenated castor oil | 64.0 |
| Casein | 50.0 |
| Magnesium stearate | 37.0 |

The hydrogenated castor oil was melted and some of the magnesium stearate (35.0 mg) mixed in until a soft mass was obtained. The procyclidine hydrochloride and casein were triturated and the mixture added to the molten wax mixture. When the resulting mixture was homogeneous and evenly soft it was turned out onto trays to cool quickly. When cold and hard the mixture was ground and sifted 30#. The rest of the magnesium stearate was added, and the granules (156.5 mg.) were compressed around the central core (a) on a compression coating machine.

(c) The outer layer

| | Mg. |
|---|---|
| Procyclidine hydrochloride, 100# | 2.0 |
| Lactose | 118.0 |
| Dextrose monohydrate, 80# | 70.0 |
| Starch | 24.4 |
| Magnesium stearate | 2.5 |

The procyclidine hydrochloride and starch were triturated. The lactose and dextrose monohydrate were mixed in successively. The mixture was granulated with 10% gelatin in 50% alcohol, sifted 30#, dried 55° and sifted 30#. The magnesium stearate was added, and the mixture compressed around the middle layer (b) on a compression coating machine.

EXAMPLE 6

A prolonged acting substantially homogeneous mixture containing benzhexol chloride or hydrochloride was made in a manner analogous to that described in Example 5(b).

EXAMPLE 7

(a) The central core

| | Mg. |
|---|---|
| Triprolidine hydrochloride | 1.25 |
| Pseudoephedrine hydrochloride | 30.0 |
| Polyethylene glycol 4000 | 20.0 |
| Magnesium stearate | 0.25 |

The triprolidine hydrochloride, pseudoephedrine hydrochloride and polyethylene glycol were mixed and granulated with 50% alcohol. The granules were sifted 20#, dried at 40° and sifted 30#. The magnesium stearate was added and the mixture compressed to a core weighing 51.5 mg.

(b) *The middle, prolonged acting layer*

|  | Mg. |
|---|---|
| Triprolidine hydrochloride | 4.0 |
| Hydrogenated castor oil | 64.0 |
| Casein | 50.0 |
| Magnesium stearate | 37.0 |

Middle layer granules were made in a manner analogous to that described in Example 5(b). The granules (155.0 mg.) were compressed around the central core (a) on a compression coating machine.

(c) *The outer layer*

|  | Mg. |
|---|---|
| Triprolidine hydrochloride | 1.25 |
| Pseudoephedrine hydrochloride | 60.0 |
| Lactose | 85.0 |
| Dextrose monohydrate, 80# | 42.0 |
| Starch | 25.0 |
| Magnesium stearate | 1.75 |

The triprolidine hydrochloride and starch were triturated. The lactose, pseudoephedrine hydrochloride and dextrose monohydrate were mixed in successively. The mixture was granulated with 10% gelatin in 50% alcohol, sifted 30#, dried at 55° and sifted 30#. The magnesium stearate was added, and the mixture was compressed around the middle layer (b) on a compression coating machine.

I claim:

1. A tablet capable of giving prolonged acting medication containing a substantially homogeneous mixture of (1) a medicament, (2) casein present in an amount of from 20 to 60 percent by weight of the mixture, and (3) a lipid of waxy consistency which is sparingly soluble in water, is slowly digestible in the digestive juices, is selected from the class consisting of fats, fatty acids and waxes, and is present in an amount of from 10 to 50 percent by weight of the mixture.

2. A tablet as set forth in claim 1 comprising a central core around which is a layer containing the substantially homogeneous mixture defined in claim 1.

3. A tablet as set forth in claim 1 having an outer layer comprising a dose of the medicament in a readily absorbed base.

4. A tablet as set forth in claim 1 wherein the lipid is mixed with an alkaline earth salt of a fatty acid.

5. A tablet as set forth in claim 1 wherein the medicament is a triprolidine salt.

6. A tablet as set forth in claim 1 wherein the medicament is a cyclizine salt.

7. A tablet as set forth in claim 1 wherein the medicament is a procyclidine salt.

8. A tablet as set forth in claim 1 wherein the medicament is a benzhexol salt.

9. A prolonged acting medicinal tablet as set forth in claim 1 containing an alkaline earth salt of a fatty acid, said salt being selected from the class consisting of calcium stearate, magnesium stearate, calcium palmitate, magnesium palmitate and zinc oleate present in an amount up to about 40 percent by weight.

References Cited in the file of this patent

UNITED STATES PATENTS

| 2,793,979 | Svedres et al. | May 28, 1957 |
| 2,887,438 | Cooper et al. | May 19, 1959 |
| 2,895,880 | Rosenthal | July 21, 1959 |

FOREIGN PATENTS

| 669,782 | Great Britain | Apr. 9, 1952 |